United States Patent
Blagodurov et al.

(10) Patent No.: US 10,318,153 B2
(45) Date of Patent: Jun. 11, 2019

(54) TECHNIQUES FOR CHANGING MANAGEMENT MODES OF MULTILEVEL MEMORY HIERARCHY

(71) Applicant: Advanced Micro Devices, Inc., Sunnyvale, CA (US)

(72) Inventors: Sergey Blagodurov, Bellevue, WA (US); Mitesh Ramesh Meswani, Austin, TX (US); Gabriel H. Loh, Bellevue, WA (US); Mauricio Breternitz, Jr., Austin, TX (US); Mark Richard Nutter, Austin, TX (US); John Robert Slice, Austin, TX (US); David Andrew Roberts, Santa Cruz, CA (US); Michael Ignatowski, Austin, TX (US); Mark Henry Oskin, Clinton, WA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 706 days.

(21) Appl. No.: 14/576,912

(22) Filed: Dec. 19, 2014

(65) Prior Publication Data

US 2016/0179382 A1   Jun. 23, 2016

(51) Int. Cl.
    *G06F 3/06* (2006.01)
(52) U.S. Cl.
    CPC .......... *G06F 3/0604* (2013.01); *G06F 3/0634* (2013.01); *G06F 3/0673* (2013.01)
(58) Field of Classification Search
    None
    See application file for complete search history.

(56) References Cited

U.S. PATENT DOCUMENTS

| 6,912,626 B1* | 6/2005 | Kirsch | G06F 15/7821 |
|  |  |  | 711/154 |
| 2013/0268728 A1* | 10/2013 | Ramanujan | G06F 12/0815 |
|  |  |  | 711/105 |

(Continued)

OTHER PUBLICATIONS

Jonghyun Lee, M. Winslett, Xiaosong Ma and Shengke Yu, "Enhancing data migration performance via parallel data compression," Proceedings 16th International Parallel and Distributed Processing Symposium, Ft. Lauderdale, FL, 2002, pp. 1-8. doi: 10.1109/IPDPS.2002.1015528.*

(Continued)

*Primary Examiner* — Edward J Dudek, Jr.
*Assistant Examiner* — Ralph A Verderamo, III (57) ABSTRACT

A processor modifies memory management mode for a range of memory locations of a multilevel memory hierarchy based on changes in an application phase of an application executing at a processor. The processor monitors the application phase (e.g., computation-bound phase, input/output phase, or memory access phase) of the executing application and in response to a change in phase consults a management policy to identify a memory management mode. The processor automatically reconfigures a memory controller and other modules so that a range of memory locations of the multilevel memory hierarchy are managed according to the identified memory management mode. By changing the memory management mode for the range of memory locations according to the application phase, the processor improves processing efficiency and flexibility.

16 Claims, 6 Drawing Sheets

(56) References Cited

U.S. PATENT DOCUMENTS

2014/0157370 A1* 6/2014 Plattner ............... G06F 21/6245
 726/4
2014/0281149 A1* 9/2014 Roberts ................ G06F 12/023
 711/103

OTHER PUBLICATIONS

Dave Hansen et al., "Hotplug Memory and the Linux VM", Linux Symposium 2004, vol. One, Jul. 2004, Ottawa, Canada, pp. 287-294.

"CPU Cache", Wikipedia, <http://en.wikipedia.org/wiki/CPU_cache#Associativity>, Accessed Mar. 25, 2015, 26 pages.

"Windows Vista I/O technologies", Wikipedia, <http://en.wikipedia.org/wiki/Windows_Vista_I/O_technologies>, Accessed Mar. 25, 2015, 5 pages.

Stephen Shankland, "IBM leaps two hurdles for next-gen memory", <http://www.cnet.com/news/ibm-leaps-two-hurdles-for-next-gen-memory/>, Published Jun. 29, 2011, Accessed Mar. 25, 2015, 5 pages.

Jack Clark, "Intel: Non-volatile memory shift means chips need an overhaul", <http://www.zdnet.com/article/intel-non-volatile-memory-shift-means-chips-need-an-overhaul/>, Published Sep. 13, 2012, Accessed Mar. 25, 2015, 6 pages.

* cited by examiner

TECHNIQUES FOR CHANGING MANAGEMENT MODES OF MULTILEVEL MEMORY HIERARCHY

BACKGROUND

Field of the Disclosure

The present disclosure relates generally to processors and more particularly to management of multilevel memory hierarchies for processors.

Description of the Related Art

Processing systems have traditionally employed a memory hierarchy that uses high-speed memory as a hardware cache to store data likely to be retrieved by a processor in the near future, and that uses lower-speed memory as "system memory" to store pages of data loaded by an executing application. Typically, the high-speed memory has represented only a small portion of the overall memory space for the processing system. Newer memory technologies, such as stacked memory and phase-change memory (PCM), are likely to provide for processing systems that employ a higher percentage of high-speed memoir), in the overall memory space. For example, while the hardware cache may be maintained as the highest-speed memory, the system memory can include different levels, with each level having a different speed. Such multilevel memory hierarchies can increase both the performance limits and the flexibility of the processing system.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate techniques for changing a memory management mode for a range of memory locations of a multilevel memory hierarchy based on changes in an application phase of an application executing at a processor. The processor monitors the application phase (e.g., computation-bound phase, input/output (I/O) phase, or memory access phase) of the executing application and in response to a change in phase consults a management policy to identify a memory management mode. The processor automatically reconfigures a memory controller and other modules so that a range of memory locations of the multilevel memory hierarchy are managed according to the identified memory management mode. By changing the memory management mode for the range of memory locations according to the application phase, the processor improves processing efficiency and flexibility.

To illustrate via an example, during one phase (e.g., a computation bound phase) the memory management mode may be such that a dynamic random access memory (DRAM) level of the multilevel memory hierarchy is configured as system memory for the executing application. When the application changes to a different phase (e.g. an I/O phase), the memory management, policy may indicate that it is more efficient for at least a portion of the DRAM to operate as a hardware cache. Accordingly, in response to the application phase change, the processor reconfigures the memory management mode for the processing system so that the DRAM is no longer configured as system memory, but instead is configured as a hardware cache. In some embodiments, the processor may perform data transfer operations to execute the management mode change. For example, the processor may transfer data associated with the system memory out from the DRAM prior to reconfiguring it to the hardware cache mode. This ensures that the integrity of data in the multilevel memory hierarchy is preserved.

A multilevel memory hierarchy is defined as a memory hierarchy of a processing system that includes memory modules of different hardware types, wherein at least some of the memory modules can be configured to operate in different memory management modes. An example of a multilevel memory hierarchy is a memory hierarchy that includes stacked DRAM configured as a dedicated hardware cache, DRAM that can be configured to operate as a hardware cache, a page cache, or as extended memory, non-volatile RAM (NVRAM) that can be configured as extended memory or as backing storage, and non-volatile memory modules (e.g., flash memory, solid state disks (SSDs) and hard disk drives (HDDs) that can be configured as backing storage.

A memory management mode for a range of memory locations, as the term is used herein, refers to the processes and techniques that a processor uses to access (load or store data) with the memory locations, and the actions that the processor takes in the event that a particular access cannot be satisfied at the range of memory locations. Examples of memory management modes include hardware cache mode, page cache mode, and extended memory mode. An application phase, as the term is used herein, refers to an interval of time wherein the application's pattern of use of one or more processing system resources, such as memory, I/O resources, execution units, and the like, is relatively unchanging (e.g., is within specified limits). Examples of application phases include computation bound phases, wherein the application is primarily performing computations at an instruction pipeline of the processor, memory access phases, wherein the application is primarily storing or retrieving data from the memory hierarchy, I/O phases, wherein the application is primarily interacting with I/O resources of the processing system, network communication phases, wherein the application is primarily communication information to and from a communication network, and the like. The term "automatically" as related to a change in memory management mode is used herein to refer to a change in the memory management mode that takes place without an explicit request or command by a user or by the application whose phase-change caused the change in the memory management mode. In some cases, the term automatically can also refer to a change in the memory management mode that takes place without and explicit request by an operating system or other software executing at the processor.

Figure 1:
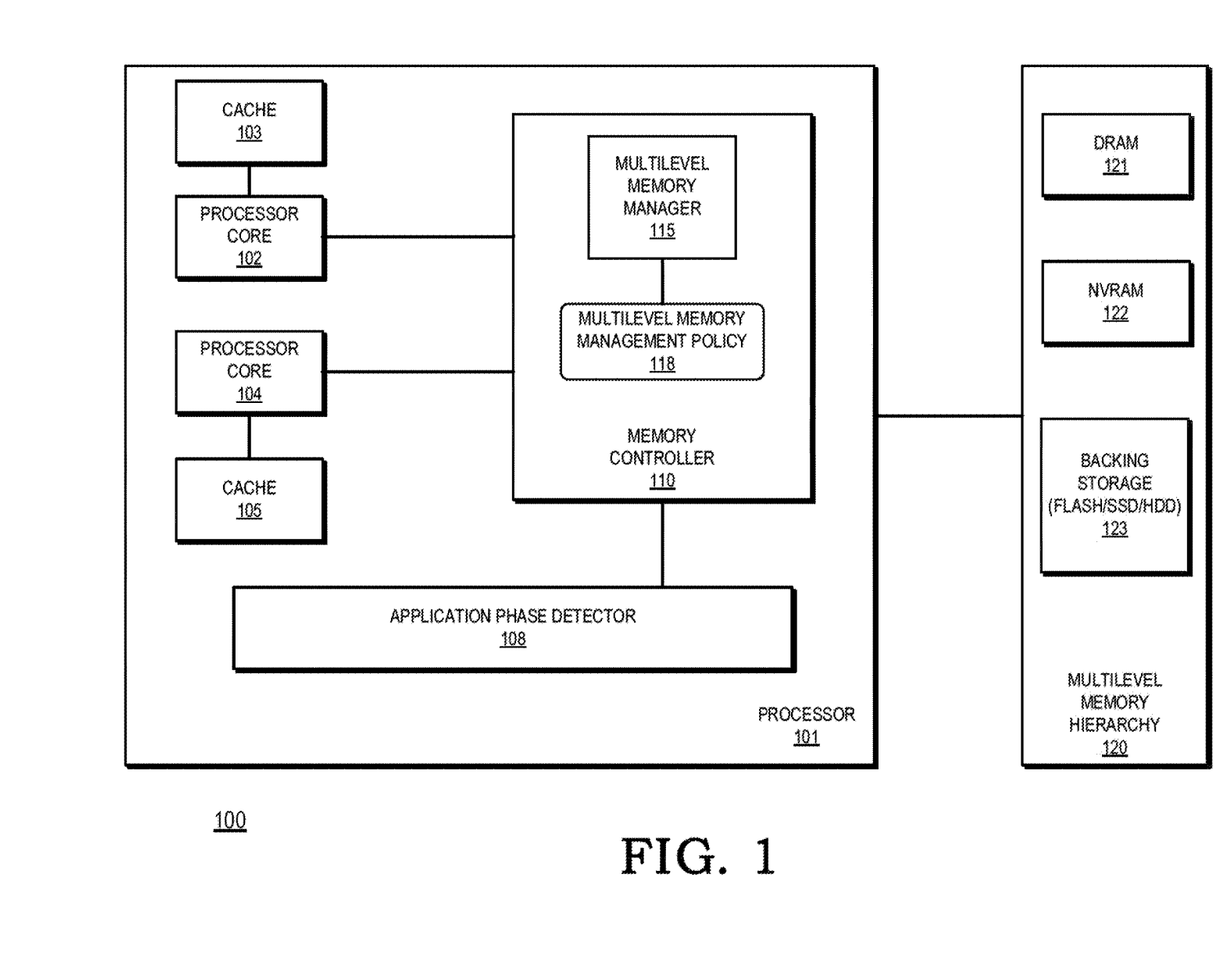
FIG. 1 is a block diagram of a processing system employing a multilevel memory hierarchy in accordance with some embodiments.

FIG. 1 illustrates a processing system 100 including a processor 101 and a multilevel memory hierarchy 120 in accordance with some embodiments. The multilevel memory hierarchy 120 includes memory modules of different types, including DRAM 121, NVRAM 122, backing storage 123 (e.g., flash memory, SSD, HDD), and stacked DRAM 124. The processor 101 includes processor cores 102 and 104, hardware caches 103 and 105, an application phase detector 108, and a memory controller 110.

The processor cores 102 and 104 each include one or more instruction pipelines to execute instructions. The instructions are arranged in collections referred to as applications. Examples of applications include productivity applications (e.g. word processor and spreadsheet programs), network communication applications (e.g. web browsers, messaging programs), application and memory management applications (e.g. operating systems), emulation applications (e.g. virtual machine applications), and the like. In the course of executing the instructions, the processor cores 102 and 104 each generate operations, referred to as memory access operations, to access data stored at one or more of the caches 103 and 105 and at one or more locations of the multilevel memory hierarchy 120. In some embodiments, the caches 103 and 105 and the modules of the multilevel memory hierarchy 120 form a memory hierarchy for the processing system 100, wherein lower levels of the memory hierarchy generally store a subset of data stored at higher levels of the memory hierarchy. The caches 103 and 105 are each located at the lowest level of the memory hierarchy for their respective processor core, and the modules of the multilevel memory hierarchy 120 are each located at higher levels, with the particular level of each memory location of the multilevel memory hierarchy governed according to the memory management mode for that memory location.

To illustrate, in some embodiments the memory hierarchy for the processing system 100 is arranged so that memory locations in a hardware cache memory management mode form the lowest levels of the memory hierarchy. Memory locations in the hardware cache option are controlled by hardware, as described further herein, to operate as a cache, such that the memory locations store data likely to be accessed by one or more of the processor cores in the near future, with individual entries (e.g. cache lines) of the hardware cache replaced according to a specified cache replacement policy. The next-higher levels of the memory hierarchy are formed by memory locations configured as system memory, wherein the memory locations collectively store pages of data that encompass multiple cache entries. The highest levels of the memory hierarchy are formed by memory locations in a backing storage memory management mode, wherein the locations are configured to persistently store data during system resets and powered-down phases. It will be appreciated that the memory locations in a given memory management mode can represent multiple levels of the memory hierarchy for the processing system 100. For example, memory locations in the hardware cache mode can be arranged to form multiple cache levels, such as a level 2 (L2) cache, a level 3 (L3) cache, and the like.

The memory controller 110 facilitates processing of memory access operations generated by the processor cores 102 and 104. In some embodiments, the processor cores 102 and 104 first attempt to satisfy a memory access operation at their connected dedicated cache (cache 103 and cache 105, respectively). If the memory access operation cannot be satisfied at the respective dedicated cache, the processor core that generated the operation provides it to the memory controller 110, which traverses the memory hierarchy of the processing system 100 until it locates the data, and transfers that data to the respective dedicated cache. The memory controller 110 also manages the memory hierarchy to ensure coherency between the different levels of the memory hierarchy. Accordingly, the memory controller 110 manages and enforces entry replacement policies for the hardware caches, processes memory access operations for page cache and extended memory locations, transfers data to and from backing storage locations to system memory locations based on requests from an operating system or other application, and the like.

The memory controller 110 includes a multilevel memory manager 115 that manages the memory management mode for each location of the multilevel memory hierarchy 120. As used herein, a location of the multilevel memory hierarchy 120 refers to a unit of the hierarchy that can be discretely accessed by a memory access operation. A location can be at any level of granularity, such as a memory row, column, page, sector, and the like. The multilevel memory manager 115 includes one or more modules that collectively assign, as described further herein, a memory management mode for each memory location and that ensure that accesses to each memory location is accessed and managed according to its assigned memory management option. For example, the multilevel memory manager 115 can include one or more tables indicating which memory locations are assigned as part of a hardware cache and the particular set (in a set-associative cache) to which each of the memory locations are assigned. The multilevel memory manager 115 can also include a tag array that stores memory tags indicating virtual or physical address information for the data cached at the memory locations that are in the hardware cache mode. The multilevel memory manager 115 contains similar modules to manage memory locations in the page cache modes, the extended memory modes, and the like.

The multilevel memory manager 115 can change the assigned memory management mode for one or more memory locations of the multilevel memory hierarchy 120 based on any of a number of criteria, as described further herein. To change the assigned memory management mode, the multilevel memory manager 115 can change a mapping table that indicates the memory management mode for each memory location to reflect the changed assignment. The multilevel memory manager 115 can further change other modules of the memory controller 110 to reflect the changed memory management mode. For example, if a memory location is changed to a hardware cache mode, the multilevel memory manager 115 can add an entry in a hardware cache tag array to correspond to the memory location, can alter stored configuration data to indicate that the number of ways of the hardware cache, or the size of each way, has increased.

To change the memory management mode for a given memory location, the multilevel memory manager can perform other operations, such as transferring data to or from the memory location, reorganizing data at the memory location, reassigning virtual addresses assigned to the memory location, and the like. The multilevel memory manager 115 thus ensures that changes in the memory management mode for each location are transparent to applications executing at the processor 101. To illustrate, when a set of memory locations are changed from a hardware cache mode to an extended memory mode, the multilevel memory manager 115 can issue operations to first transfer data (or at least data that has been modified at the hardware cache) to a different set of memory locations already in the extended memory mode, thus ensuring that data coherency is maintained. Further, the multilevel memory manager 115 can reorganize the stored data to ensure that it is more optimally organized for the changed memory management mode, such as moving data likely to be accessed together to contiguous memory locations.

The application phase detector 108 monitors operations at the processor cores 102 and 104 to identify an application phase for an application executing at the processor 100. In some embodiments, the application phase detector 108 identifies the application phase based on monitored run-time performance information, such as cache accesses, memory accesses, I/O activity, network communication activity, and the like. The application phase detector 108 may also use non-run-time information, such as compiler analysis information for the executing program, to identify the application phase. In response to identifying a change in the application phase, the application phase detector signals the change to the memory controller 110.

The memory controller 110 can access a multilevel memory management policy 118, which stores information indicating, for each application phase, the required memory management mode for one or more memory locations of the multilevel memory hierarchy 120. The multilevel memory management policy may be a fixed policy that is developed during testing and characterization of a design of the processor 101 or the processing system 100. In some embodiments, the multilevel memory management policy is a dynamic policy that can be adjusted by an operating system or other application based on processor conditions, user input, and the like. In some embodiments, the multilevel memory management policy 118 can be selected from a set of possible policies according to an operating profile or mode of the processing system 100. For example, in some embodiments the processing system 100 may selectively operate in a performance mode and a reduced-power mode, and the multilevel memory management policy 118 selected from a set of policies (not shown) based on the mode.

In response to an indication of an application phase Change, the multilevel memory manager 115 accesses a multilevel memory management policy 118, the multilevel memory manager 115 consults the multilevel memory management policy 118 to identify the memory management mode for the memory locations of the multilevel memory hierarchy. In response to determining that the mode for one or more of the memory locations is to be changed, the multilevel memory manager 115 modifies the memory management modes for the one or more memory locations to comply with the multilevel memory management policy 118.

Figure 2:
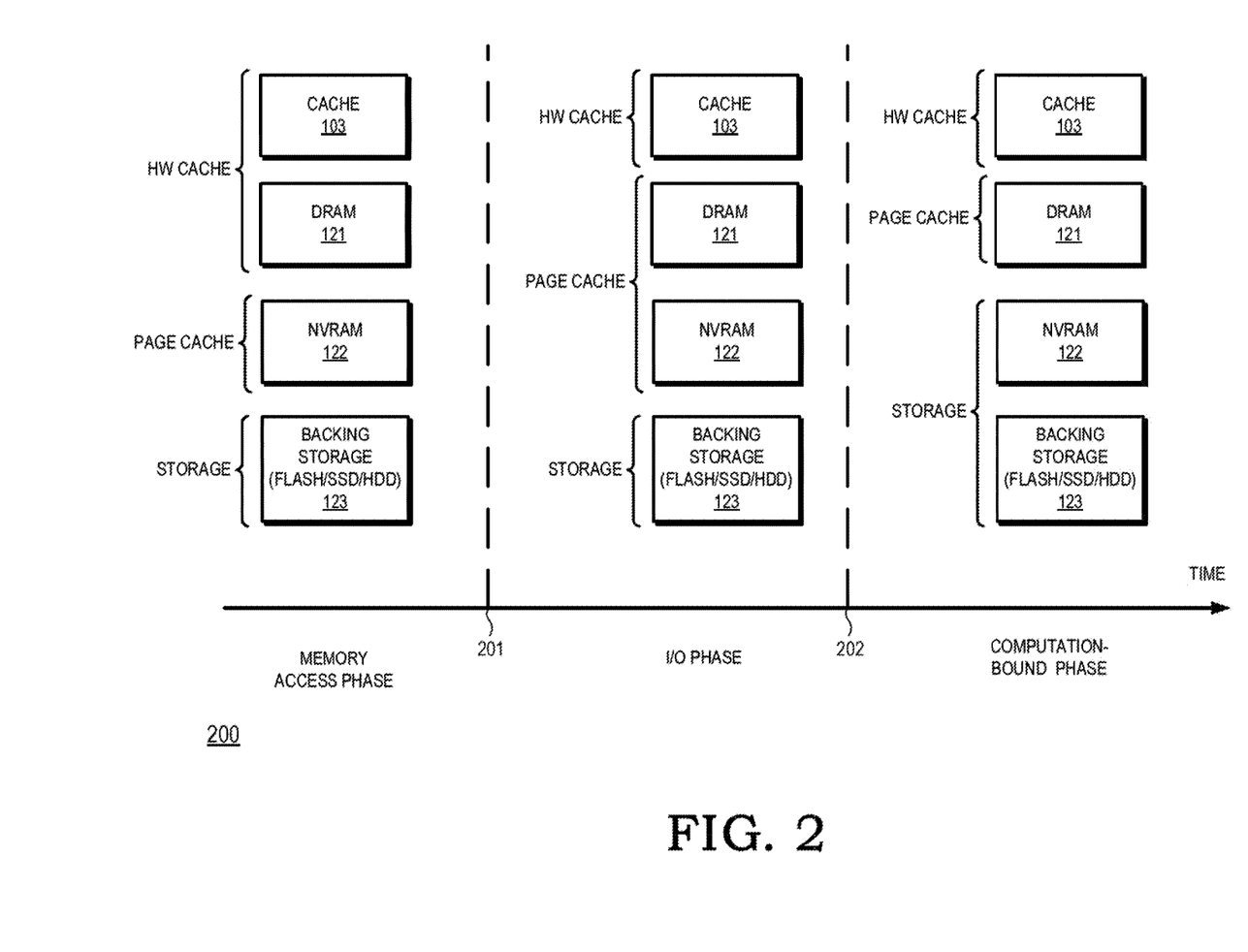
FIG. 2 is a diagram illustrating changing the management mode of the multilevel memory hierarchy of FIG. 1 in accordance with some embodiments.

FIG. 2 illustrates an example of the multilevel memory manager 115 changing the memory management mode for modules of the multilevel memory hierarchy 120 in response to an application phase change. In the illustrated example, prior to a time 201, the application executing at the processor 101 is in a computation-bound phase, wherein its primary activity is executing computations at the processor 101. Accordingly, based on the multilevel memory management policy 118, the multilevel memory manager 115 has set the memory management mode for the modules of the multilevel memory hierarchy 120 as follows: the stacked DRAM 124 and the DRAM 121 are configured to be in the hardware cache mode (so that it forms a hardware cache hierarchy with the cache 103), the NVRAM 122 is configured to be in a system memory mode, and the backing storage 123 is configured to be in the backing storage mode.

At time 201, the application executing at the processor 101 changes from the computation-bound phase to a memory access phase, wherein the application is primarily storing and retrieving data to and from the memory hierarchy. The application phase detector 108 detects this change in application phase and signals the change to the memory controller 110. In response, the multilevel memory manager 115 accesses the multilevel memory management policy 118, which indicates that in the memory access phase the DRAM 121 is to be in the system memory mode. Accordingly, the multilevel memory manager 115 reconfigures the modules of the memory controller 110 to set the memory management mode for the modules of the multilevel memory hierarchy 120 as follows: the DRAM 121 and the NVRAM 122 are configured to be in the system memory mode and the backing storage 123 is configured to be in the backing storage mode. The stacked DRAM 124 remains in the hardware cache mode.

At time 202, the application executing at the processor 101 changes from the memory access phase to an I/O phase, wherein the application is primarily interacting with one or more input/output devices. In response to this change in application phase, the multilevel memory manager 115 accesses the multilevel memory management policy 118, which indicates that in the I/O phase the NVRAM 122 is to be in the backing storage mode, while the other modules are to be set to the same mode as for the memory access phase. Accordingly, the multilevel memory manager 115 reconfigures the modules of the memory controller 110 to set the memory management mode for the modules of the multilevel memory hierarchy 120 as follows: the DRAM 121 is configured to be in the system memory mode and the NVRAM 122 and the backing storage 123 are configured to be in the backing storage mode. Thus, the multilevel memory manager 115 can change the memory management mode for each module of the multilevel memory hierarchy 120 based on changes in the application phase in order to better satisfy a set of goals (e.g. reduced power, improved performance) reflected in the multilevel memory management policy 118.

Figure 3:
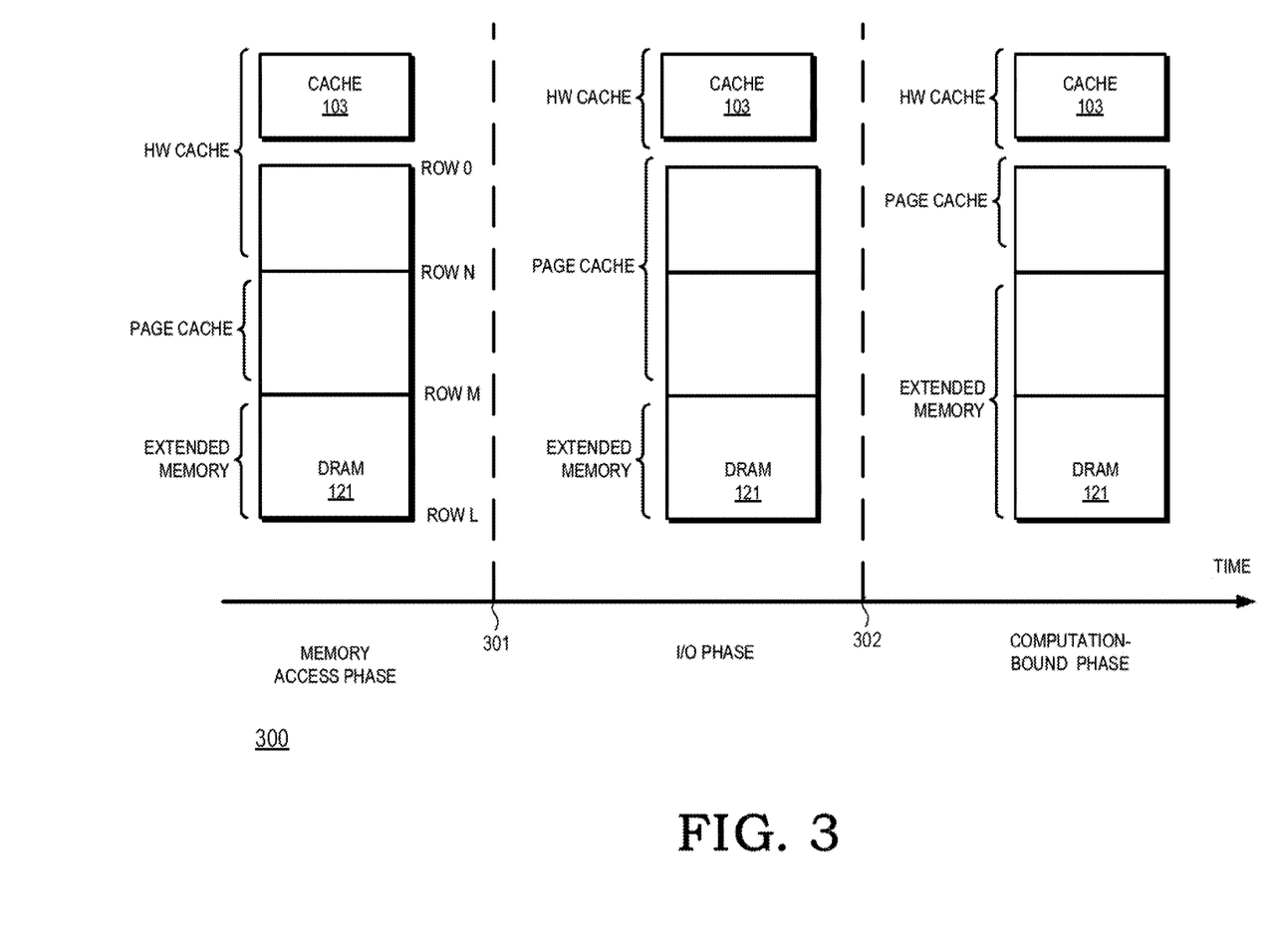
FIG. 3 is a diagram illustrating changing the management mode for a subset of memory locations of one type of memory of the multilevel memory hierarchy of FIG. 1 in accordance with some embodiments.

In some embodiments, the multilevel memory manager 115 can set the management mode differently for different subsets of memory locations of a given memory type. A subset of memory locations refers to a portion (fewer than all) of the memory locations of a given memory type. For example, the multilevel memory manager 115 can set the management mode for individual rows, or sets of rows, of the DRAM 121. This allows the management mode for different memory locations to be set at a desired level of granularity, allowing for further flexibility at the multilevel memory hierarchy. An example is illustrated at FIG. 3, which depicts an example of the multilevel memory manager 115 changing the memory management mode for sets of rows of the DRAM 121 in response to an application phase change in accordance with some embodiments.

In the depicted example, prior to a time 301 the application executing at the processor 101 is in a computation-bound phase. Accordingly, based on the multilevel memory management policy 118, the multilevel memory manager 115 has configured the rows of the DRAM 121 as follows: rows 0 through N are configured in the hardware cache mode (so that they form a hardware cache hierarchy with the cache 103), rows N+1 through row L (including row M) are configured in the system memory mode (where N, M, and L are integer values).

At time 301, the application executing at the processor 101 changes from the computation-bound phase to the memory access phase. In response, the multilevel memory manager 115 sets, based on the multilevel memory management policy 118, the memory management modes of the rows of the DRAM 121 as follows: rows 0 through L are configured in the system memory mode.

At time 302, the application executing at the processor 101 changes from the memory access phase to the I/O phase. In response, the multilevel memory manager 115 sets the memory management modes of the rows of the DRAM 121 as follows: rows 0 through M are configured in the hardware cache mode and rows M+1 through L are configured in the system memory mode.

The multilevel memory manager 115 can select the range of memory locations for management mode change based on any of a number of different criteria. In some embodiments, the processing system 100 may be fully dedicated to a workload of a particular type (e.g., batch-like computation workloads), and the range of memory locations is selected to include most or all of the memory locations for a given memory type.

In some embodiments, the processing system 100 may execute different workloads for different entities. For example, the processing system 100 may concurrently execute different virtual machines, with different memory locations of the multilevel memory hierarchy dedicated to different ones of the virtual machines. In such a scenario, each virtual machine may have its own dedicated multilevel memory management policy (with the policies being different for different virtual machines). The application phase detector 108 can detect phase changes for each application executing at each virtual machine and, in response to a phase change at a particular application, the multilevel memory manager 115 can change the memory management options for those memory locations dedicated to the corresponding virtual machine. Accordingly, in response to receiving an indication that an application phase has changed, the multilevel memory manager 115 selects the subset of memory locations dedicated to the corresponding virtual machine, and changes the memory management option for those memory locations.

In some embodiments, an application may include different functions, wherein each function exhibits different memory access patterns. In such a scenario, when an application phase changes, the multilevel memory manager 115 can select the range of memory locations based on the particular function that is being (or is to be) executed. For example, if the multilevel memory manager 115 receives an indication that a given function is to be executed (e.g., a database function), in response to an indication of an application phase change the multilevel memory manager 115 selects a subset of memory locations of the multilevel memory hierarchy 120 based on the given function type, and changes the memory management mode for the selected subset of memory locations. The particular range of memory locations to be selected for each type of function can be indicated by a programmer when developing the application, automatically by a compiler when the application is being compiled, and the like.

Figure 4:
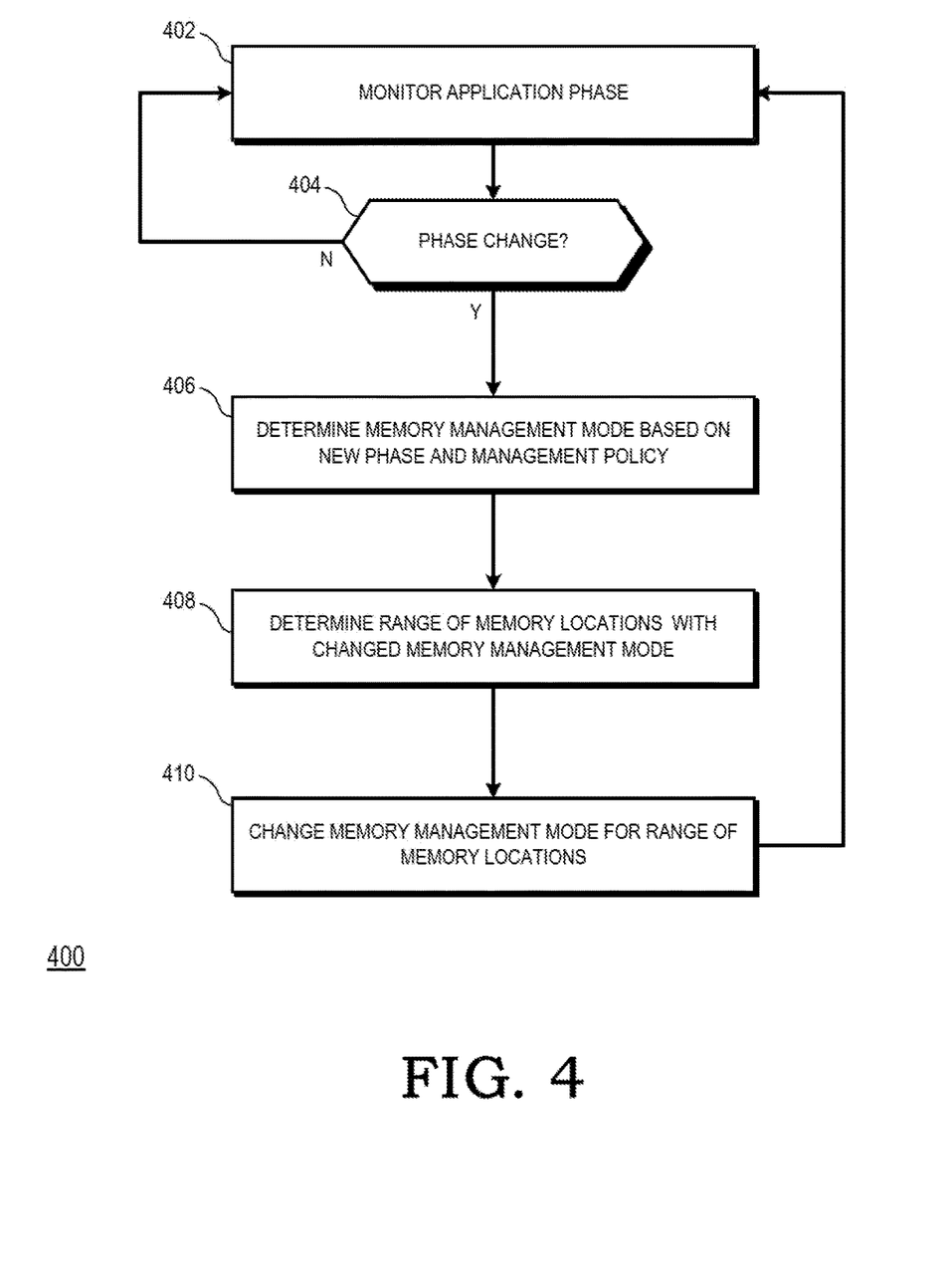
FIG. 4 is a flow diagram illustrating a method of changing the management mode of the multilevel memory hierarchy of FIG. 1 in accordance with some embodiments.

FIG. 4 illustrates a flow diagram of a method 400 of changing the management mode of the multilevel memory hierarchy 120 of FIG. 1 in accordance with some embodiments. At block 402 the application phase detector 108 monitors the application phase of an application executing at the processor 101. At block 404 the application phase detector 108 identifies whether the application phase has changed. If not, the method flow returns to block 402 and the application phase detector 108 continues monitoring the application phase.

If, at block 404, the application phase detector 108 identifies a change in application phase, the application phase detector 108 signals the change to the memory controller 110. The method flow proceeds to block 406 and the multilevel memory manager 115 identifies the memory management modes for the memory locations of the multilevel memory hierarchy 120 based on the new application phase and the multilevel memory management policy 118. At block 408 the multilevel memory manager 115 identifies the memory locations of the multilevel memory hierarchy 120 for which the memory management mode has changed. At block 410 the multilevel memory manager 115 changes the memory management mode for the identified locations to the mode indicated by the multilevel memory management policy 118 and the new application phase. The method flow returns to block 402 and the application phase detector 108 continues monitoring the application phase.

Figure 5:
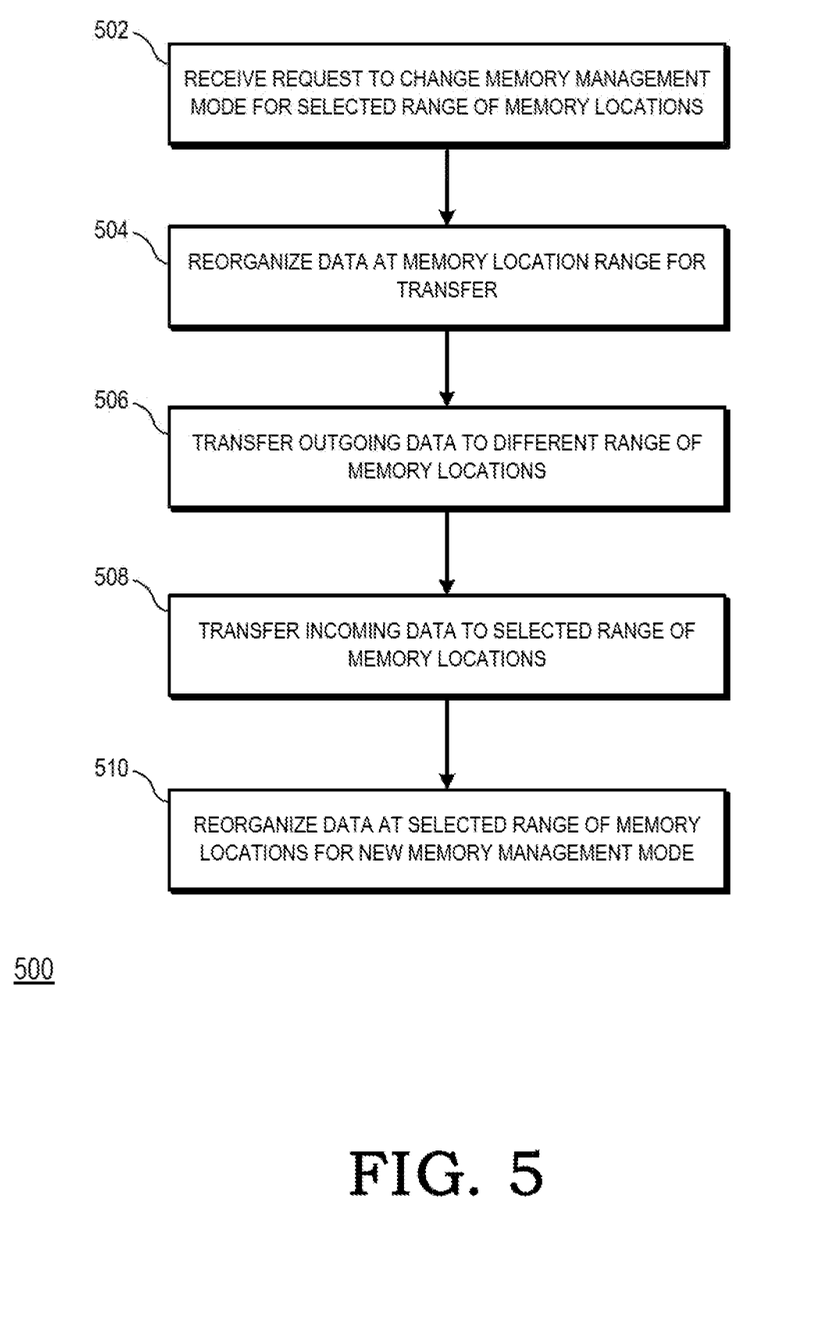
FIG. 5 is a flow diagram illustrating a method of transferring data from memory locations of the multilevel memory hierarchy of FIG. 1 in accordance with some embodiments.

FIG. 5 is a flow diagram illustrating a method 500 of transferring data from memory locations of the multilevel memory hierarchy 120 in response to a change in memory management mode in accordance with some embodiments. At block 502, the multilevel memory manager 115 identifies, in response to a change in application phase, a request to change a memory management mode for a range of memory locations of the multilevel memory hierarchy 120. In response, at block 504 the multilevel memory manager 115 issues one or more operations to reorganize data stored at the range of memory locations for transfer, based on the memory management mode of the locations to which the data is being transferred. For example, if the data being transferred is being transferred to locations in the page cache mode, the multilevel memory manager 115 can organize the data so that data associated with a given set of virtual addresses correspond to a given memory page.

At block 506, the multilevel memory manager 115 transfers the data at the range of memory locations to a different range of memory locations, thereby preventing loss of data. At block 508 the multilevel memory manager 115 issues one or more operations to transfer designated incoming data to the range of memory locations, based on the new memory management mode for the memory location range. For example, if the range of memory locations is being placed in the system memory mode, the multilevel memory manager 115 transfers the appropriate page data from backing, storage to the range of memory locations. This ensures that the change in memory management mode is transparent to the executing application. At block 510 the multilevel memory manager 115 reorganizes the data at the selected range of memory locations to optimize the data storage for the new memory management mode.

For purposes of description, when a range of memory locations is being changed from memory management mode A to memory management mode B, it is sometimes referred to as being "switched out" from memory management mode A and "switched in" to memory management mode B. In some embodiments, the particular way data is transferred to and from a range of memory locations as part of a change in memory management modes depends on the mode being switched out and the mode being switched in. The following are some examples of how the memory management mode for a range of memory locations can be switched in and switched out.

For memory locations in a hardware cache mode, to perform a switch out procedure for the hardware cache, any changes to data stored at the memory locations while in the hardware cache mode are transferred to a different range of memory locations that are in the extended memory mode. In some embodiments, this transfer is implemented with a special barrier and flush instructions.

To perform a switch in procedure to the hardware cache mode, any level 1 (L1) cache locations are first released by an operating, system. After that, the hardware modules at the memory controller 110 responsible for maintaining the hardware cache of the processing system 100 will be activated and start to gradually populate the cache with the data from higher cache levels. In some embodiments, this process will mimic that of a cache in a clean state right after system boot.

For memory locations in the system memory mode, to perform a switch out to the hardware cache mode the data at the memory locations is transferred to memory locations in the backing storage mode. The memory locations are then unmounted as storage devices and exposed as hot-pluggable memory modules to an executing operating system. Once this is done, the L1 cache is cleaned from all the operating system managed memory pages. In one embodiment, the pages are moved to an L2 cache by issuing a system call that changes the pages' physical location without changing the virtual address of each page. After the pages have been moved, the multilevel memory manager 115 removes the memory locations from the memory space managed by the OS, via memory hot-plug functionality.

For memory locations in the system memory mode, to perform a switch out to the backing storage: the data at the memory locations is transferred to memory locations in the backing storage mode. The memory locations are then unmounted as storage devices and exposed as hot-pluggable memory modules to an executing operating system.

To perform a switch in to the system memory mode from a hardware cache mode, the range of memory locations at that moment is stored in the L2 cache and the L1 cache is clean. Accordingly, the multilevel memory manager populates the L1 cache with the hot pages from the L2 cache. Any L2 cache pages that have been modified are transferred to memory locations in the backing storage mode. Once this is done, the L2 cache memory locations are removed from the memory space managed by the OS and can then mounted as storage devices. In some embodiments, data stored at the backing storage are transferred to the memory locations that have been changed to the page cache mode.

To perform a switch out from system memory mode to the hardware cache mode, the L1 cache is first cleaned from all OS managed memory pages first. In some embodiments, the pages can be moved to the slower memory regions by issuing a system call that changes its physical location without changing the virtual address of the page. The multilevel memory manager then removes the memory locations from the memory space managed by the OS.

To perform a switch out from the backing storage mode to the system memory mode: the L2 cache is cleaned from all the OS managed memory pages. To do that, the multilevel memory manager 115 transfers dirty (modified) pages to memory locations in the backing storage mode, removes the memory locations of the L2 cache from the memory space managed by the OS, and mounts the L2 cache locations as storage devices.

In some embodiments, the apparatus and techniques described above are implemented in a system comprising one or more integrated circuit (IC) devices (also referred to as integrated circuit packages or microchips), such as the processor described above with reference to FIGS. 1-5. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD). Blu-Ray disc), magnetic media (e.g., floppy disc magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 6:
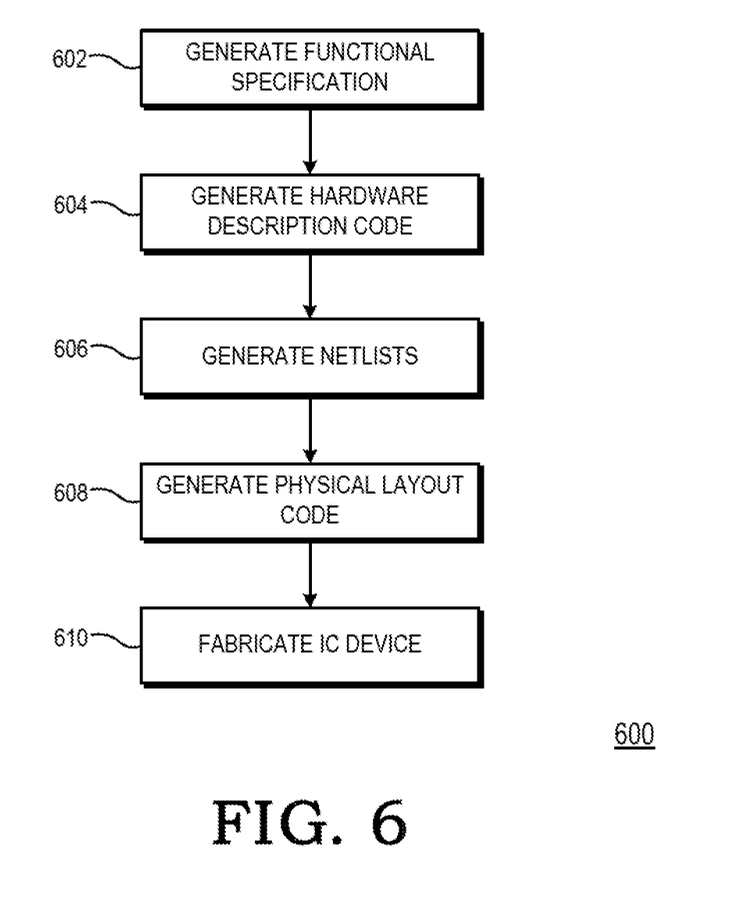
FIG. 6 is a flow diagram illustrating a method for designing and fabricating an integrated circuit device implementing at least a portion of a component of a processing system in accordance with some embodiments.

FIG. 6 is a flow diagram illustrating an example method 500 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 602 a functional specification for the IC device is generated. The functional specification (often referred to as a micro architecture specification (MAS)) may be represented by any of a variety of programming languages or modeling languages, including C, C++, SystemC, Simulink, or MATLAB.

At block 604, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 606 a synthesis tool is used to synthesize the hardware description code to generate code representing or defining an initial physical implementation of the circuitry of the IC device. In some embodiments, the synthesis tool generates one or more netlists comprising circuit device instances e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 608, one or more EDA tools use the netlists produced at block 606 to generate code representing the physical layout of the circuitry of the IC device. This process can include, for example, a placement tool using, the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 610, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, of elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   in response to a change in a phase of an application executing at a processor:
      selecting a range of memory locations of a multilevel memory;
      reorganizing data stored at the selected range of memory locations based on a management mode of a first range of memory locations different from the selected range of memory locations;
      transferring reorganized data stored at the selected range of memory locations to the first range of memory locations, and
      changing the management mode of the selected range of memory locations.

2. The method of claim 1, wherein changing the management mode of the selected range of memory locations further comprises:
   transferring data stored at a second range of memory locations to the selected range of memory locations.

3. The method of claim 1, further comprising:
   detecting the change in the phase of the application based on run-time performance information.

4. The method of claim 1, wherein the selected range of memory locations is a subset of memory locations of a type of memory of the multilevel memory.

5. The method of claim 1, wherein changing the management mode comprises changing use of the selected range of memory locations from a hardware cache mode to a system memory mode.

6. The method of claim 1, wherein changing the management mode comprises changing use of the selected range of memory locations from a system memory mode to a backing storage mode.

7. The method of claim 1, wherein the phase of the application is selected from a group consisting of a computation-bound phase, a memory access phase, an input/output (I/O) phase, and a network communication phase.

8. A method, comprising:
in response to a change in a memory management mode from a first memory management mode to a second memory management mode for a first range of memory locations that are a subset of a first memory type of a multilevel memory hierarchy:
reorganizing first data stored at the first range of memory locations based on the memory management mode for a second range of memory locations, wherein different memory management modes are concurrently assigned to the first and second range of memory locations;
transferring the reorganized first data stored at the first range of memory locations to the second range of memory locations; and
transferring, based on the second memory management mode for the first range of memory locations, second data stored at a third range of memory locations to the first range of memory locations.

9. The method of claim 8, further comprising:
initiating the change in the memory management mode in response to a change in a phase of an application executing at a processor.

10. The method of claim 8, further comprising:
in response to the change in the memory management mode for the first range of memory locations, changing a set of virtual addresses corresponding to the first range of memory locations.

11. The method of claim 8, wherein the first memory type is random access memory, and the change in the memory management mode comprises a change from a hardware cache mode to a system memory mode.

12. The method of claim 8, wherein the first memory type is flash memory, and the change in the memory management mode comprises a change from a system memory mode to a backing storage mode.

13. A processor, comprising:
an application phase detector to identify an application phase for an application executing at the processor; and
a multilevel memory manager to:
in response to an indication from the application phase detector that the application phase has changed, select a range of memory locations of a multilevel memory;
reorganize data stored at the selected range of memory locations based on a management mode of a first range of memory locations different from the selected range of memory locations;
transfer the reorganized data stored at the selected range of memory locations to the first range of memory locations; and
change the management mode of the selected range of memory locations.

14. The processor of claim 13, wherein the multilevel memory manager is to change the management mode of the selected range of memory locations by:
transferring data stored at a second range of memory locations to the selected range of memory locations.

15. The processor of claim 13, wherein the multilevel memory manager is to change the management mode of the selected range of memory locations by:
changing a set of virtual addresses associated with the selected range of memory locations from a first set to a second set.

16. The processor of claim 13, wherein the selected range of memory locations is a subset of memory locations of a memory type of the multilevel memory.

* * * * *